Aug. 24, 1948.  J. C. CROWLEY  2,447,740
TIRE REPAIR CLAMP

Filed Oct. 8, 1945  2 Sheets-Sheet 1

INVENTOR.
JOHN C. CROWLEY
BY
Kwis Hudson, Boughton & Williams
ATTORNEYS

Aug. 24, 1948.   J. C. CROWLEY   2,447,740
TIRE REPAIR CLAMP
Filed Oct. 8, 1945   2 Sheets-Sheet 2
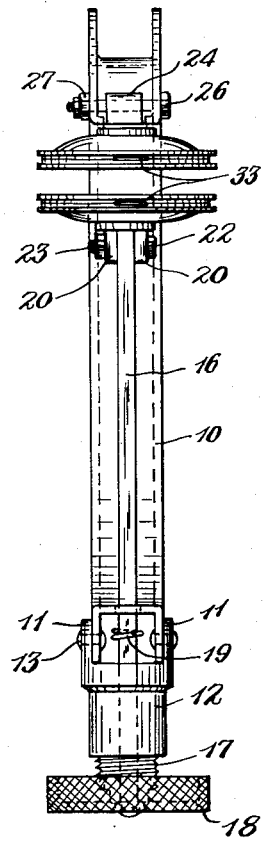
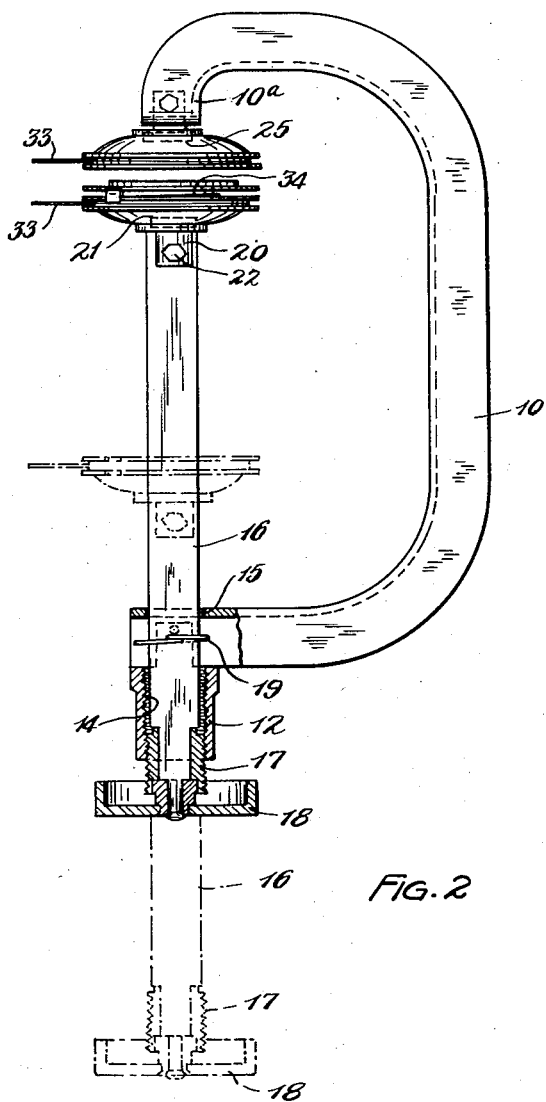
INVENTOR.
JOHN C. CROWLEY
BY
Kwis Hudson Boughton & Williams
ATTORNEYS Patented Aug. 24, 1948

2,447,740

UNITED STATES PATENT OFFICE 2,447,740

TIRE REPAIR CLAMP

John C. Crowley, Willoughby, Ohio, assignor to The Dill Manufacturing Company, Cleveland, Ohio, a corporation of Ohio Application October 8, 1945, Serial No. 620,862

4 Claims. (Cl. 18—18)

This invention relates to a tire repair clamp which primarily is adapted to be used for repairing tires although it is susceptible of other uses.

An object of the invention is to provide a tire repair clamp which is simple in construction, is formed of a minimum number of parts that can be readily manufactured and assembled, and is efficient in operation.

A further object of the invention is to provide a tire repair clamp which can be applied to the tire with facility and dispatch in that the major portion of the relative movement between the pressure applying members is effected by fast sliding movement of the part which carries one of said members, until the members are almost in their clamping relationship, after which slow clamping movement between the members is brought about by a pressure applying mechanism.

A further object is to provide a tire repair clamp which can be applied to the tread portion or to the side wall of a tire casing as desired.

A further object of the invention is to provide a tire repair clamp by which a repair patch can be applied to the interior and the exterior of the tire simultaneously.

A still further object of the invention is to provide a lightweight portable tire repair clamp that can be easily applied to any portion of the tire while the latter is lying on a repair bench, on the floor or roadway or in any other place it might be situated in.

Further and additional objects and advantages not hereinbefore specified will become apparent in the detailed description of an embodiment of the invention which is to follow.

Referring to the accompanying drawing,

Fig. 2 is a part elevational and part sectional view of the tire repair clamp, the movable part which carries one of the pressure applying members of the clamp being indicated by dot and dash lines in its inoperative position.

Fig. 3 is an elevational view of the tire repair clamp and is taken looking from the left hand side of Fig. 2.

Figure 1:
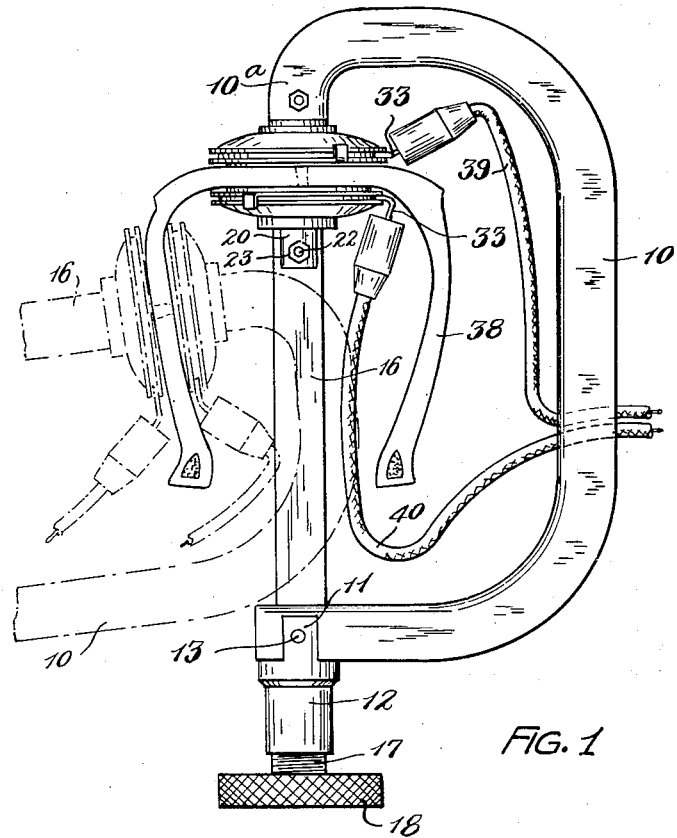
Fig. 1 is an elevational view of a tire repair clamp embodying the invention, with the clamp shown by full lines applied to the tread portion of a tire casing and by dot and dash lines applied to the side wall of said casing.
Figure 4:
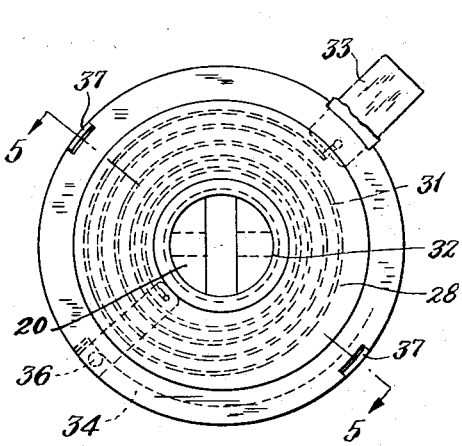
Fig. 4 is a plan view of one of the pressure applying members which includes the patch carrying part and the part that has the heating element.

The tire repair clamp embodying the invention comprises a substantially C-shaped support 10 which has one of its ends turned or curved as indicated at 10a to extend substantially parallel for a short distance to the main part of the support. The support 10 may be formed of any suitable material and may have any suitable cross-sectional configuration but as indicated herein for purposes of illustration the support is channel-shaped in cross-section. The straight end of the support 10 opposite to the curved end 10a thereof has the spaced ears 11 of a tubular member 12 straddling it and rigidly secured thereto by suitable securing means such as by rivets 13. The tubular member 12 is internally threaded as indicated at 14.

The end of the support 10 in line with the tubular member 12 is provided with an opening 15 through which non-rotatably extends a bar 16, the lower end of which bar is reduced in width and is swivelly connected to an externally threaded nut member 17 and an operating knob 18 that is rigidly connected to the nut and preferably is knurled on its periphery. The bar 16 within the channel of the support 10 is provided with a bent wire spring 19 which exerts a slight frictional resistance to the longitudinal movement of the bar 16 through the opening 15, the support 10 and the tubular member 12. It will be noted that the width of the bar 16 is such that it has free longitudinal movement within the member 12 and therefore the bar 16 can be rapidly moved from the dot-dash line position of Fig. 2 by simply pushing the bar longitudinally until the nut 17 engages the lower end of the tubular member 12. Thereafter rotation of the knob 18 and nut 17 will cause the latter to screw into the internally threaded member 12 and will produce a slow longitudinal movement to the bar 16 for a purpose later to be explained.

The free end of the bar 16 is straddled by the legs 20 of a securing element and said legs are integrally formed with the disk-like head 21 of said element. The legs 20 are secured in straddling position upon the end of the bar 16 by a bolt 22 extending through aligned openings in the legs and in the bar and held in position by the nut 23. A securing element in the form of a plug 24 having an integral disk-like head 25 is secured in the curved end 10a of the support by means of a bolt 26 passing through aligned openings in the sides of the support and in the plug 24 and held in assembled position by nut 27. The securing elements attached to the bar 16 and to the curved end 10a of the support enable vulcanizing units, such as disclosed in my reissue Patent 21,230 granted October 10, 1939, to be swivelly connected to the bar 16 and to the curved portion 10a of the support.

Figure 5:
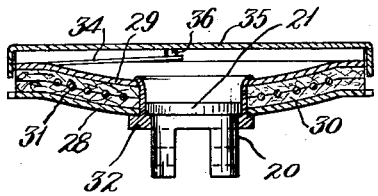
Fig. 5 is a sectional view taken approximately on line 5—5 of Fig. 4, looking in the direction of the arrow.

These vulcanizing units as stated in said reissue patent comprise a heat producing part or member and a patch carrying part or member. The former part or member comprises a pair of spaced plates 28 and 29 having therebetween suitable insulation as indicated in Fig. 5 at 30 and in which is embedded an electrical resistance element 31. The plates 28 and 29 are held together in assembled relationship by a hollow rivet 32. One end of the resistance element 31 is electrically connected to a tab 33 while the opposite end of said resistance element may be electrically connected to the plate 29. In my said reissue patent the plate 29 is shown as provided with a spring finger 34 cut from the material of the plate and underlying an end of the resistance element in such a manner that when said spring finger is pressed in one direction it engages the end of the resistance element and then the plate 29 is electrically connected to said element.

The vulcanizing unit disclosed in my said Reissue Patent 21,230 also includes a patch carrying member or part in the form of a disk 35 which is placed against the plate 29 and is provided with a fusible plug 36 that contacts the spring finger 34 of the plate 29 and holds said finger in engagement with the end of the resistance element 31. The plate 28 which is slightly greater in diameter than the plate 29 is provided at its peripheral edge with spaced notches of predetermined size and location and which notches are engaged by lugs 37 formed on the disk to hold the disk in the proper position relative to the heat producing part of the unit.

It will be understood that when the resistance element 31 is placed in an electrical circuit, vulcanizing heat is produced and when said heat attains to a predetermined degree the fusible plug 36 of the disk fuses to automatically interrupt the circuit through the resistance element. Rather than describe in greater detail herein the heat producing member and the disk which is applied thereto, reference is made to my said Reissue Patent 21,230 for a complete description of the construction and mode of operation of the vulcanizing unit.

The vulcanizing units are swivelly connected to the securing elements carried by the bar 16 and by the curved portion 10a of the support 10 by passing the legs 20 of the one securing element through the hollow rivet 32 of the one unit until the head 21 of the securing element engages the outturned end of the rivet 32 and by passing the plug 24 through the hollow rivet 32 of the other unit until the head 25 of the plug similarly engages the outwardly flared end of the rivet (see Figs. 2 and 5).

Assuming that vulcanizing units have been swivelly connected to the bar 16 and to the curved end 10a of the support and that said bar is in the dot and dash line position of Fig. 2 and it is desired to repair the tread portion of a tire casing 38 the clamp is arranged so that the curved end 10a of the support 10 overlies the outer side of the tread portion of the casing, while the bar 16 is in position to be extended inwardly of the casing into engagement with the inner side of the tread portion thereof. The user of the tire repair clamp now pushes on the knob 18 to impart a rapid longitudinal movement to the bar 16 until the vulcanizing unit carried by the bar is almost contacting the inner side of the tread portion of the casing. At this time, the nut 17 has engaged the lower end of the tubular member 12, whereupon rotation of the knob 18 will cause the nut to screw into the tubular member and to move the bar 16 slowly toward the tread portion until the vulcanizing units are tightly clamping the tread portion between them. The disk members or parts of the vulcanizing units may both be provided with repair patches or only one of the disks may be so provided according to the nature of the repair job to be performed.

With the tread portion of the casing tightly clamped between the vulcanizing units, the operator now connects the lead 39 of one side of a suitable electrical circuit to the tab 33 of the vulcanizing unit that is swivelly connected to the curved end 10a of the support 10 and connects the lead 40 of the other side of the circuit to the tab 33 of the vulcanizing unit that is swivelly connected to the bar 16. The vulcanizing units are thus electrically connected in series in the same circuit through the support 10 and the bar 16.

Assuming that electrical energy is flowing through said circuit the resistance elements 31 of both vulcanizing units will produce vulcanizing heat to effect the vulcanization of the patch or patches to the tread portion of the casing and until the plug or plugs 36 fuse and interrupt the circuit.

If it is the side wall of the casing that is to be repaired the tire repair clamp can be positioned as indicated by dot and dash lines of Fig. 1 with the vulcanizing units clamping the side wall between them. It will be noted that the curvature of the support 10 is such that the repair clamp can be used with equal facility for repairing the tread portion of the casing or the side wall thereof. It will also be noted that the device can be applied with great facility and dispatch, particularly since it is not necessary to rotate the knob 18 except to apply the clamping pressure between the vulcanizing units and that prior to such time the bar 16 can be given a rapid longitudinal movement. Consequently the tire repair clamp hereinbefore disclosed presents a simple, easily and quickly applied portable repair device for repairing interiorly or exteriorly or both either the tread portion or the side wall of a tire casing.

It will also be noted that the clamp can be applied to the tire while the tire is lying on a repair bench, on the garage floor, on the roadway or any other place, as distinguished from the usual bulky vulcanizing apparatus into which the tire must be positioned.

Although a preferred embodiment of the invention has been illustrated and described herein, it will be understood that the invention is susceptible of various modifications and adaptations within the scope of the appended claims.

Having thus described my invention, I claim:

1. A tire repair clamp comprising a support having its opposite end portions extending in the same lateral direction, a vulcanizing unit connected to one of said portions and an internally threaded sleeve carried by the other of said portions, an elongated member non-rotatably carried by said other of said portions and aligned with said unit, a vulcanizing unit carried by one end of said member and adapted to cooperate with said first unit and an externally threaded member carried by the other end of said elongated member, said elongated member intermediate its ends being freely slidable through said sleeve, said sleeve and externally threaded member being relatively rotatable and screw-threadedly cooperating with each other to impart slow endwise non-rotative movement to said elongated member after it has been slid endwise quickly a distance sufficient to bring said units into predetermined proximity.

2. A tire repair clamp as defined in claim 1 and wherein said internally threaded sleeve is fixedly carried by said other portion while said externally threaded member is rotatably carried by the other end of said elongated member.

3. A tire repair clamp comprising a substantially C-shaped support having one of its end portions curved to extend substantially parallel to the main part of the support, a vulcanizing unit secured to the free end of said one end portion, the other end portion of the support being provided with an opening therethrough aligned with said unit, an internally threaded sleeve rigidly secured to said other end portion in alignment with said opening and extending from said other end portion on the side thereof remote from said one end portion, an endwise movable non-rotatable elongated member having a vulcanizing unit mounted on its end that is adjacent to said first unit and an externally threaded sleeve rotatably carried by its other end, said member intermediate its ends being freely slidable through said opening and said first sleeve, said second sleeve being adapted to screw into said first sleeve after said member has been slid endwise quickly a distance sufficient to bring said vulcanizing units into predetermined proximity.

4. A tire repair clamp comprising a substantially C-shaped support, a vulcanizing unit secured to one end of said support, the other end of said support being provided with an opening therethrough aligned with said unit, an internally threaded sleeve carried by said other end of said support in alignment with said opening, an endwise movable elongated member non-rotatably carried by said other end of said support and provided with a vulcanizing unit at its end which is adjacent to said first unit and at its opposite end with an externally threaded sleeve, said member intermediate its ends being freely slidable through said first sleeve and said opening, and spring means associated with said member intermediate its ends and resisting sliding movement thereof, said sleeves being relatively rotatable wherefore after said member has been quickly slid a distance sufficient to bring said vulcanizing units into predetermined proximity relative rotation between said sleeves imparts slow endwise clamping movement to said member.

JOHN C. CROWLEY.

REFERENCES CITED

The following references are of record in the file of this patent:

UNITED STATES PATENTS

| Number | Name | Date |
| --- | --- | --- |
| Re. 21,230 | Crowley | Oct. 10, 1939 |
| 658,583 | Pridmore | Sept. 25, 1900 |
| 1,718,485 | O'Sullivan | June 25, 1929 |
| 2,121,085 | Krumholz | June 21, 1938 |
| 2,158,703 | Kite | May 16, 1939 |
| 2,292,485 | Slatkin | Aug. 11, 1942 |